Sept. 6, 1966 K. L. SACKS 3,270,911
COFFEE MAKER LID RETAINING MEANS
Filed Aug. 3, 1964

Inventor:
Kenneth L. Sacks
by Gordon H. Olson
Attorney

United States Patent Office 3,270,911
Patented Sept. 6, 1966

3,270,911
COFFEE MAKER LID RETAINING MEANS
Kenneth L. Sacks, Allentown, Pa., assignor to General Electric Company, a corporation of New York
Filed Aug. 3, 1964, Ser. No. 387,046
7 Claims. (Cl. 220—55)

This invention relates to an improved means for retaining a lid within an open top of a coffee maker or similar container.

It is desirable that the lids for coffee makers be provided with positive means by which the lid will be retained in position. Perhaps the most common method for such lid retention is merely to provide outwardly extending bumps or protuberances on the exterior surface of the lid annular skirt so that the bumps will provide an interference fit with the surrounding inner surface of the container. While such an arrangement is very simple and inexpensive, this can produce tight or loose fitting lids with variations in tolerances. A lid which is overly tight and hence difficult to remove is a source of irritation to the user and might cause spillage of the contents of the container. Naturally, if the contents are hot as in a coffee maker, this could be quite dangerous.

It is the general object of this invention to provide an improved, low cost lid retaining means which provides the desired fit for a wide range of tolerance variation for both the lid and the container.

Briefly stated, the invention includes a coffee maker or similar container having a body with an open top, a lid with an annular skirt adapted to fit within the top, and an improved means for retaining the lid in the top. There is provided a flat, flexible, irregularly shaped spring metal clip having end portions which extend through a pair of closely spaced slots formed in the skirt and further having a middle portion which extends outwardly away from the skirt. The clip is formed such that when assembled to the lid the end portions are self-urged to engage the interior of the skirt and the middle portion of the clip is self-urged outwardly, whereby the outermost surface of the middle portion is adapted to forcefully engage the inner edge of the container defining the open top. With such a unique arrangement, the clip provides the necessary retention throughout a relatively wide range of tolerances for the dimensions of the lid and container body.

Further features, objects and advantages of the invention will become apparent with reference to the following drawings in which.

Figure 1:
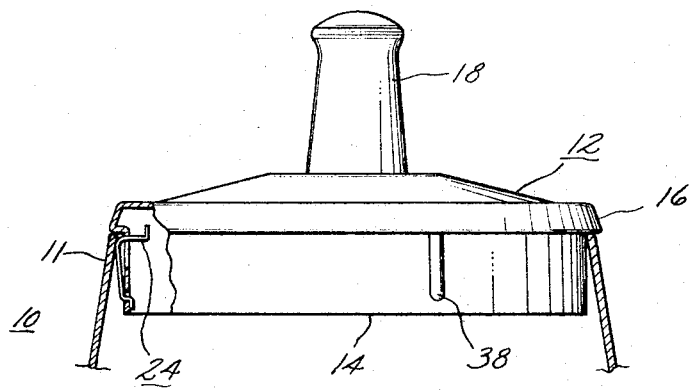
FIG. 1 is a partially sectionalized, elevational view of a portion of a coffee maker and its lid including the improved retaining means of the invention.

Referring now to the drawings, there is shown in FIG. 1 a portion of a percolator 10 having an open top defined by the upper edge of the side wall 11, with a lid 12 positioned within the top. More specifically, the lid is formed with an annular skirt 14 which fits within the open top and an annular flange 16 which abuts the top surface of the container to limit the inward or downward movement of the lid. The percolator lid may also be provided with a suitable bubbler knob 18.

Figure 2:
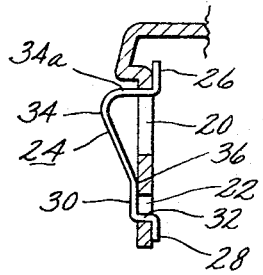
FIG. 2 is an enlarged cross-sectional view of the lid and retaining clip.

In accordance with the invention, the lid skirt 14 is formed with an upper, vertically oriented slot 20 and a lower slot 22 spaced beneath the upper slot, as best seen in FIG. 2. A uniquely formed, flat, flexible clip 24 is provided to cooperate with the slots 20 and 22 to perform the lid retaining function. The clip 24 is formed with an upper, vertically extending end 26, a lower, vertically extending end 28, an outer, vertically oriented portion 30, a horizontally extending portion 32 joining portion 30 and end 28, and an outwardly curved or bowed middle portion 34 having its lower end connected to the vertical portion 30 and its horizontally flat upper end 34a connected to end 26.

Figure 4:
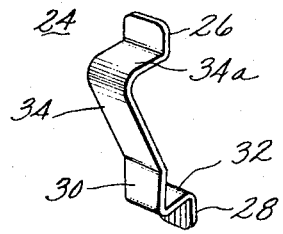
FIG. 4 is a perspective view of the clip.
Figure 3:
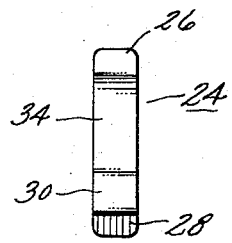
FIG. 3 is a front elevational view of the retaining clip.

The clip is made of spring metal or similar material which will flex and tend to snap or spring back to its original position. As can be seen from FIG. 4, when the clip 24 is not assembled to the lid, or in other words, is in a free state, the upper end 26 assumes a position to the left of the lower end 28. End 26 forms substantially a right angle with portion 34a although the angle is preferably slightly less than 90°. Similarly end 26 forms a right angle or slightly less than a right angle with portion 32. Portion 30 is essentially perpendicular to portion 32.

In assembly, the lower end 28 is inserted within the lower slot 22, as shown, and the upper end of the clip is depressed by pressure against the horizontal portion 34a of curved portion 34 so that upper end 26 can be inserted within upper slot 20. Note that slot 20 must have adequate length to accommodate the largest dimension of end 26. The clip is then released and it assumes the position shown in FIG. 2 wherein the end portions 26 and 28 are in roughly the same vertical plane. Since the clip is self-urged to return to the free state of FIG. 4, end 26 is urged outwardly against the inner surface of the skirt above slot 20 and portion 30 is urged inwardly against the outer surface 36 of the skirt directly above slot 22. This in turn urges the outer surface of end 28 against the inner surface of the skirt beneath slot 22. This stressing of the clip also urges curved portion 34 outwardly to hold its outermost point a fixed distance from the skirt.

With such an arrangement, the outer surface of curved portion 34 follows the contour and forcefully engages the inner surface of wall 11 of the percolator 10 when the lid is positioned as shown in FIG. 1. The interference between the clip and the wall 11 forces the upper portion of the clip radially inwardly as shown. This action further stresses the clip causing an outward force by end 28 on the inner skirt surface below slot 22. When the lid is withdrawn this additional force is removed and the flexibility of the clip causes it to snap back to the position shown in FIG. 2. Note that with the clip positioned as shown with its ends engaging the interior of the skirt the lid interior may be easily cleaned without interference from the clip.

A primary advantage of the lid retention means of the invention is that the desired snug fit can be inexpensively obtained with a relatively wide tolerance variation. That is, the dimensions of the annular skirt 14 and the container wall 11 can vary rather greatly since the clip has a considerable movement in the radial direction to accommodate such tolerance ranges while still producing the desired fit. It should also be appreciated that the flexing of the clip caused when the lid is installed provides positive force components directed against the interior of the container. Further the curved outer portion 34 of the clip will readily cooperate with various container contours. The described arrangement is particularly suited for use with a container of the type illustrated in which the walls taper inwardly at the top so that the top opening is smaller than the cross-section of the container immediately below the top. With such containers the retention forces, produced by the clip are increased as the lid is pulled upwardly, until the outer curved portion of the clip has been withdrawn from the upper edge of the container opening.

Note also that due to the configuration and positioning of the clip, primarily a radially directed force is needed to push the clip inwardly; and in view of the relation between the tapered container wall and the clip, the radial force component of an upwardly directed force on the lid is relatively small. Hence, it can be realized that considerable lid retentive powers are obtained from a small inexpensive clip of the type described. If necessary or desirable, the skirt may also be provided with one or more outwardly extending bumps or protuberances 38 to improve the fit.

Other aspects of the clip which add to its attractiveness are that it is very simply assembled to the lid and does not require an additional fastening member. Naturally, due to its flexibility it is self-urged outwardly and does not require an additional spring member. The tolerance compensating characteristics of the clip are particularly important when used with metal containers which are heated and subjected to expansion and contraction, such as percolators. On the other hand, the clip is very suitable for use with lids or container bodies made of plastic or glass.

In a typical percolator situation, it is desirable to have the total force between the lid and the percolator body to be less than the weight of the percolator body, but more than the weight of the lid. With such relation, the percolator cannot be lifted by pulling on the lid knob 18 in that the lid will be withdrawn instead. On the other hand, if the percolator is inverted (while empty), the lid will not fall out of the percolator body.

While a particular arrangement of the invention has been described in the foregoing paragraphs, it will be apparent that various changes and modifications in the structure will readily come to mind without departing from the spirit and intent of the invention or the scope of the appended claims.

What I claim is:

1. In a container having an open top and a lid with an annular skirt adapted to fit within the top, an improved means for retaining the lid in the top comprising a pair of closely spaced slots formed in said skirt, a flat, flexible irregularly shaped spring clip having end portions which extend through said slots into the interior of said skirt and having a middle portion which extends outwardly away from said skirt, said clip being formed such that when assembled to the lid the end portions are self-urged to engage the interior of said skirt and the middle portion of the clip is self-urged outwardly whereby the outermost surface of the middle portion is adapted to forcefully engage the inner surface of the container defining the open top.

2. The construction of claim 1 wherein the characteristics of said percolator and the lid and the clip are such that the frictional force produced by said clip is less than the weight of the percolator but greater than the weight of the lid.

3. In a coffee maker having an open top and a lid with an annular skirt adapted to fit within the top, an improved means for retaining the lid in the top comprising an upper vertically oriented slot formed in said skirt, a lower slot formed in said skirt beneath and spaced from the upper slot, a flat, flexible irregularly shaped spring clip having substantially right angle end portions which extend through said slots to engage the interior surface of said skirt and having a middle portion which bows outwardly away from said skirt, said clip being formed such that when assembled to the lid the upper end of the clip and the middle portion of the clip are self-urged outwardly whereby the middle portion is adapted to forcefully engage the inner surface of the coffee maker defining the open top.

4. In a container having an open top and a lid with an annular skirt adapted to fit within the top, an improved means for retaining the lid in the top comprising an upper slot formed in said skirt, a lower slot formed in said skirt positioned beneath and spaced from the upper slot, a flexible clip including a lower end positioned with its outer surface in contact with the inner surface of the portion of said skirt beneath said slot, an outer vertical portion having its inner surface in contact with the outer surface of the portion of said skirt directly above said lower slot, a portion extending through said lower slot connecting said lower end to said outer portion, an upper end with its outer surface positioned in contact with the inner surface of the portion of said skirt directly above said upper slot, a curved portion having one end joined to said outer vertical portion and having its opposite end extending through said upper slot and joining said upper end, said clip being formed such that when assembled to the lid said upper end and said curved portion are self-urged outwardly whereby the curved portion will forcefully engage the container surface defining the open top.

5. A container having an open top and a lid with an annular skirt adapted to fit within the top, an improved means for retaining the lid in the top comprising an upper slot formed in said skirt, a lower slot formed in said skirt beneath and spaced from the upper slot, a flat spring metal clip including a lower end positioned within said skirt with its outer surface in contact with the inner surface of the portion of said skirt beneath said slot, an outer vertical portion having its inner surface in contact with the outer surface of the portion of said skirt directly above said lower slot, a portion extending through said lower slot connecting the upper end of said lower portion to the lower end of said outer portion, an upper end positioned within said skirt with its outer surface in contact with the inner surface of the portion of said skirt directly above said upper slot, a curved portion having its lower end joined to the upper end of said outer portion and having its upper end extending through said upper slot and joining the lower end of said clip upper end, said curved portion having a middle section which is spaced outwardly away from said skirt, said clip when assembled to the lid being stressed such that said curved portion can be flexibly moved inwardly but is self-urged outwardly whereby it will forcefully engage the percolator surface defining the open top.

6. A coffee maker having side walls tapered inwardly at their upper ends to define an open top, a lid with a skirt which fits within the top, and an improved means for retaining the lid in the top comprising an upper slot formed in said skirt, a lower slot formed in said skirt spaced beneath the upper slot, a flat, flexible irregularly shaped spring clip having end portions which extend through said slots to engage the interior surface of said skirt and having a middle portion which bows outwardly away from said skirt, said clip being formed such that when assembled to the lid the upper end of the clip and the middle portion of the clip are self-urged outwardly whereby the middle portion is adapted to forcefully engage an inner surface of one of said walls defining the open top.

7. The coffee maker of claim 6 in which said lid has an outwardly extending flange adjoining the upper end of said skirt to limit the downward movement of the lid into the coffee maker.

References Cited by the Examiner

UNITED STATES PATENTS

| 2,077,590 | 4/1937 | Seghers | 220—82.5 |
| 2,134,585 | 10/1938 | Seghers | 220—82.5 |

THERON E. CONDON, *Primary Examiner.*

J. B. MARBERT, *Assistant Examiner.*